C. N. PARKER.
LOCK NUT.
APPLICATION FILED MAR. 22, 1915.
1,197,759.
Patented Sept. 12, 1916.
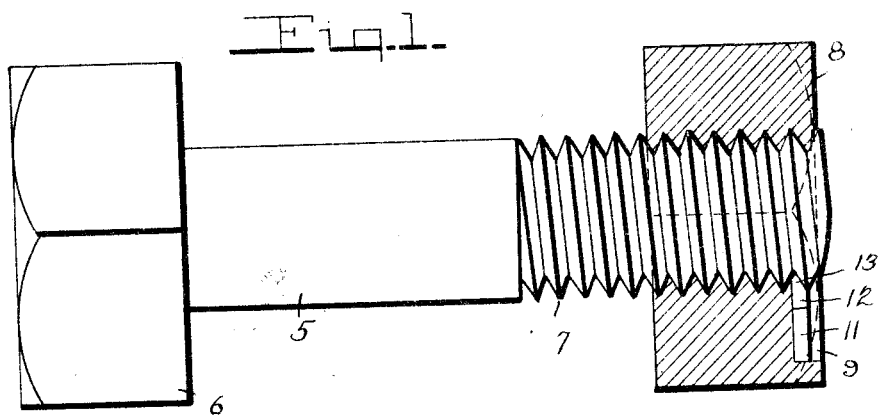
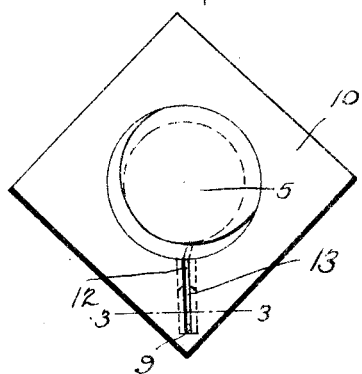
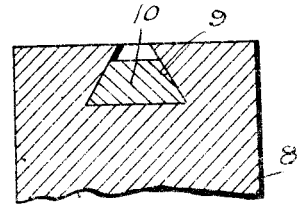
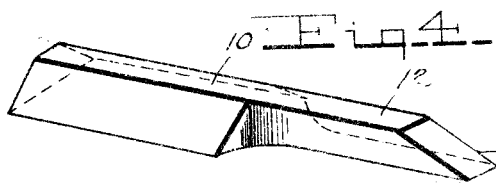
Inventor
C. N. Parker
Witnesses

UNITED STATES PATENT OFFICE.

CHARLES N. PARKER, OF PALATKA, FLORIDA.

LOCK-NUT.

1,197,759. Specification of Letters Patent. Patented Sept. 12, 1916.

Application filed March 22, 1915. Serial No. 16,201.

*To all whom it may concern:*

Be it known that I, CHARLES N. PARKER, a citizen of the United States, residing at Palatka, in the county of Putnam and State of Florida, have invented certain new and useful Improvements in Lock-Nuts; and I do hereby declare the following to be a full, clear, and exact description of the invention, such as will enable others skilled in the art to which it appertains to make and use the same.

This invention has for its object to provide a simple and efficient lock nut embodying essentially a locking key slidably engaged within a recess formed radially in the outer face of the nut and having a reduced bolt thread-engaging end adapted to bite into the threads of the bolt to lock the nut against rotational movement in one direction thereon.

With this and other objects in view, the invention consists in the novel construction, arrangement and formation of parts as will be hereinafter specifically described, claimed and illustrated in the accompanying drawing, in which:

Figure 1 represents a side elevation of a bolt, illustrating the improved lock nut in section. Fig. 2 represents an end elevation of the nut and bolt. Fig. 3 represents a transverse sectional view on the line 3—3 of Fig. 2, and Fig. 4 represents an enlarged detail perspective view of the locking key removed.

Referring to the drawing in detail, wherein similar reference numerals designate corresponding parts throughout the several views, the numeral 5 indicates the shank of a bolt which may be of any preferred construction and includes a head 6 and screwthreads 7 extending inwardly from the opposite end thereof. A nut 8 is threaded upon the shank 5 of the bolt and is formed in its outer face with a recess or seat 9 extending radially from the internally screwthreaded bore and terminating in spaced relation to the side faces thereof. The longitudinal side walls of the recess or seat 9 are outwardly converging and slidably receive the correspondingly shaped body portion 10 of the locking key, designated generally by the numeral 11 and including a reduced extension 12 having a beveled end 13 designed to snugly fit the threads 7 of the bolt. The locking key 11 is preferably constructed of spring metal and is of slightly greater length than the distance between the screwthreads 7 of the bolt and the outer end wall of the recess 9 so as to cause the reduced extension 12 to curve or bend slightly, as illustrated in Fig. 2, when the nut 8 is advanced upon the bolt.

In use, the key 11 is inserted in the seat or recess 9, prior to the application of the nut on the bolt and the nut 8 is then positioned upon the screwthreaded end of the bolt 5 and advanced to the desired position thereon, the tapered extremity of the extension 12 engaging the groove of the thread 7. The key is prevented from lateral removal from the groove 9 by the oppositely inclined side walls thereof engaging the correspondingly shaped walls of the groove. Rotational movement of the nut 8 upon the bolt in a direction to remove the nut therefrom, tends to straighten the spring extension 12 of the key and thus the beveled end 13 bites into the thread of the bolt and reliably locks the nut against removal.

What I claim is:

A lock nut comprising a nut having an internally screwthreaded bore and a radial groove in one face communicating with the bore and having outwardly converging side walls, a locking key including a body having the side faces inclined correspondingly to the converging side walls of said recess and being slidable longitudinally in said groove and secured against lateral removal from the latter, and a reduced resilient extension on said key having a beveled end adapted to engage the screwthread of a bolt fitted in the nut.

In testimony whereof I affix my signature in presence of two witnesses.

CHARLES N. PARKER.

Witnesses:
WALTER H. CROWELL,
RANDALL WELLS.